United States Patent [19]

Wetterhorn et al.

[11] 4,168,631
[45] Sep. 25, 1979

[54] AMPLIFIER MOUNTING CONSTRUCTION FOR A PRESSURE GAUGE

[75] Inventors: Richard H. Wetterhorn; Harold W. Wilson, both of Fairfield, Conn.

[73] Assignee: Dresser Industries, Inc., Dallas, Tex.

[21] Appl. No.: 948,369

[22] Filed: Oct. 4, 1978

[51] Int. Cl.² .............................................. G01L 7/04
[52] U.S. Cl. ........................................ 73/741; 73/740
[58] Field of Search ................. 73/740, 741, 732–739, 73/742, 743, 756

[56] References Cited

U.S. PATENT DOCUMENTS

| | | | |
|---|---|---|---|
| 1,835,561 | 12/1931 | Eshbaugh | 73/732 |
| 2,297,679 | 10/1942 | Allen | 73/715 |
| 2,447,739 | 8/1948 | Courtney | 73/732 |

Primary Examiner—Donald O. Woodiel
Attorney, Agent, or Firm—Daniel Rubin

[57] ABSTRACT

The floating amplifier of a pressure gauge is mounted onto the free end of the Bourdon tube at various effective spacings therefrom correlated to offset any residual tip travel of the individual Bourdon tube.

4 Claims, 3 Drawing Figures

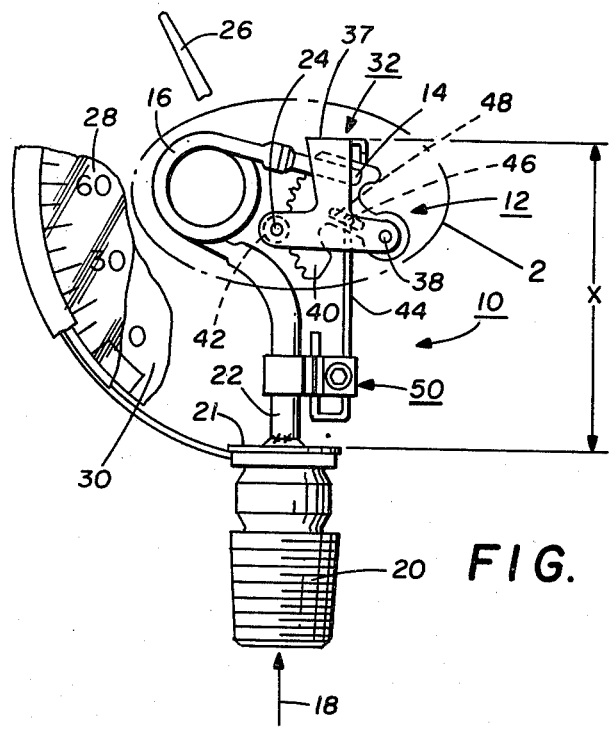
FIG. 1
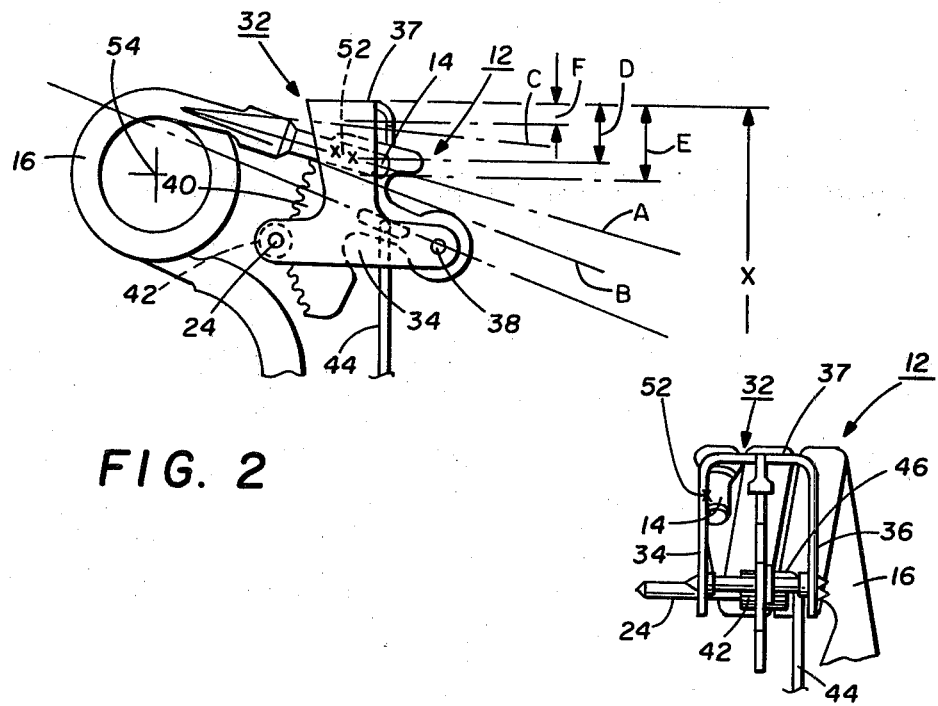
FIG. 2
FIG. 3

AMPLIFIER MOUNTING CONSTRUCTION FOR A PRESSURE GAUGE

TECHNICAL FIELD

The field of art to which the invention pertains includes the art of measuring and testing as applicable to amplifier movements for gauge instruments.

BACKGROUND OF THE INVENTION

Amplifier movements for use with pressure gauges, temperature gauges or the like are well known and have been used commercially for many years. Typically, such gauges have a condition responsive element such as a bellows, Bourdon tube, bi-metal coil or the like providing selected displacement motion in response to condition changes to which the element is sensitive and exposed. In a common construction, the amplifier or "movement" is comprised of leverage and gearing operably responsive to displacement motion of the condition responsive element for driving an output shaft supporting a pointer movable relative to a fixed dial plate. The dial registration opposite the pointer position is indicative of the condition state such as pressure or temperature with which the instrument is being operative.

Disclosed in U.S. Pat. No. 4,055,085 to R. H. Wetterhorn is a pressure gauge in which the amplifier is supported on the free end of a Bourdon tube for floating conjoint movement with displacement of the tube. A remotely connected actuator extending into the motion path of the floating amplifier defines a pivot axis for a hinged gear sector arm thereof. In pivotting about the actuator axis, the sector arm operably drives a rotatable output shaft supporting the pointer. In a typical production manufacture of such gauges, a clip of sorts has been utilized for securing or connecting the amplifier onto the tube end.

Accuracy of such gauges is, of course, a key criteria in the manufacture and marketing thereof and as described in the above Wetterhorn patent, the geometries and interrelationships of the working components of a floating movement are critical if the desired level of operational accuracy is to be maintained. For this reason, manufacturing tolerances of these components have been carefully controlled to ensure these interrelationships. Notwithstanding, it has only recently been realized that minor deviations in the mechanical spring properties of the Bourdon tube can per se cause sufficient differences in residual recovery from its coiling formation that its post-formed tip orientation can vary significantly from tube to tube. In practice, its has been found that Bourdon tube tip orientation can vary vertically from its intended or ideal location about plus or minus 0.050 inches and which variation effects non-linearity of the gauge on the order of up to about five percent. Despite recognition of the foregoing, a ready solution has not heretofore been known.

SUMMARY OF THE INVENTION

This invention relates to pressure gauges and more specifically to a mounting structure for securing the floating amplifier to the free end of the Bourdon tube in such gauges. In accordance with the invention, the previous problem of non-linearity resulting from variation in residual tip travel of the Bourdon tube is readily and inexpensively offset by utilizing a variable effective spacing custom set between the tube end and the point of connection to the amplifier. The extent of variation in the offset spacing is effected as a function of the amount of tube tip travel deviation of each individual tube from its norm as measured along a predetermined axis. Rather than having to literally determine the extent of residual tip travel deviation for each individual Bourdon tube and then effecting correction as by trial and error bending of the tube end, the amplifier is oriented with respect to another fixed reference indicia before connection to the tube end is effected. Instead of using a clip connection in the manner of the prior art, the amplifier bracket is mounted onto the tube at whatever location is determined by a fixturing device which effects the foregoing orientation with respect to the fixed reference indicia.

It is therefore an object of the invention to provide a novel amplifier mounting structure for enhancing operational linearity of a floating amplifier-Bourdon tube type pressure gauge.

It is a further object of the invention to effect the previous object by effectively varying the spacing between the free end of the Bourdon tube and its point of connection to the floating movement to compensate for deviations in residual tip travel of the tube.

BRIEF DESCRIPTION OF THE DRAWINGS

FIG. 1 is a fragmentary front elevation of a pressure gauge utilizing the amplifier to Bourdon tube variable spacing connection in accordance herewith;

FIG. 2 is a fragmentary enlargement of the encircled portion of FIG. 1; and

FIG. 3 is a fragmentary side elevation of the enlargement of FIG. 2.

Referring first to FIG. 1, there is illustrated a pressure gauge 10 having a floating amplifier 12 of a type disclosed in the Wetterhorn patent supra and supported in a manner to be described on the free end 14 of coiled Bourdon tube 16. Pressure represented by arrow 18 is received inward of threaded socket 20 wherefrom it is transmitted to the inlet 22 of the Bourdon tube. By virtue of amplifier 12 being mounted on tube end 14, the amplifier floats conjointly therewith to effectively drive a shaft 24 supporting a pointer 26 as will be understood. Arcuate displacement of the pointer via rotation of shaft 24 reflects values of pressure as represented by graduations 28 on dial face 30.

As more fully described in the above Wetterhorn patent, amplifier 12 is comprised of a centrally upright inverted U-shaped carriage or frame 32 integrally formed to include symmetrically spaced side legs 34 and 36. The frame is secured to the free end 14 of the Bourdon tube as by weld 52 and supports rotatable transverse shafts 24 and 38. The latter shaft provides a hinge support for a geared sector arm 40 while shaft 24 supports a pinion 42 meshing with sector arm 40 for displacing pointer 26 as described above. To effect amplifier operation there is provided an actuator 44 comprising an elongated wire bent to offset at its upper end 46 for receipt in slot 48 of sector arm 40. At its other end, actuator 44 is secured in a clamp 50 which preferably is of a type disclosed in Wetterhorn application entitled "Actuator Clamp for Floating Gauge Amplifier" cofiled herewith.

Referring now more specifically to FIGS. 2 and 3, coiled Bourdon tube 16 has a polar point helix axis designated 54. The free end 14 of the Bourdon tube is shown for purpose of understanding the invention as oriented along a center line "A" which can be considered hypothetically to represent the normal spring back orientation assumed by the tube end after coiling of the tube about axis 54 has been completed. Center lines "B" and "C", respectively, represent center line orientation of tube end 14 deviating below and above the norm on the basis of any residual tip travel resulting from tube coiling. It can be appreciated that were amplifier 12 to be connected directly to tube end 14 without regard to such deviations, the amplifier would be physically lowered or raised with respect to its normal position if the residual situations of center lines "B" or "C" had been encountered. Consequently, for maintaining the position of amplifier 12 irrespective of tube end orientation, the predetermined connection therebetween in the manner of the prior art is eliminated and instead side 34 of the bracket is welded or otherwise connected to the tube at a location 52 on the side face.

For determining location 52, a fixture (not shown) is utilized in the course of assembly to maintain a fixed distance X (FIG. 1) between the top face 37 of bracket 32 and the parallel top face 21 of socket 20. Distance X will, of course, vary with gauge size but within a given size of like capacity and construction distance X is constant. In terms of distance from top surface 37, weld location 52 will occur at a distance "D" for normal tube orientation, and at comparable distances "E" and "F" for below and above norm, respectively.

In the above manner, the position of amplifier 12 from which non-linearity could otherwise result is not distorted but, in effect, retains its relative position from gauge to gauge by merely compensating for the point of connection with tube end 14 without regard to ultimate orientation of the latter. The resulting connection is so significantly simple to effect yet resolves a longstanding problem with regard to non-linearity resulting from failure to afford compensation therefor in the prior art.

By the above description there is disclosed a novel structure for mounting a floating amplifier in a pressure gauge to the free end of the Bourdon tube utilizing various effective spacings therebetween correlated to offset the effects of any deviated residual tip travel of the tube. By effectively varying the spacings rather than employing a preset spacing in the manner of the prior art, the non-linearity aspect of the instrument has been readily resolved in a highly economical and convenient manner without imposing any cost penalty on the construction of such gauges.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. In a pressure gauge including a Bourdon tube operative to effect displacement in correlation to changes in pressure to which the Bourdon tube is exposed, and an amplifier secured to the displacement end of said Bourdon tube for floating conjoint movement therewith, said amplifier being secured to said Bourdon tube at varying effective spacings therebetween correlated to compensate against residual tip travel of the Bourdon tube deviated from a predetermined norm.

2. In a pressure gauge according to claim 1 in which said amplifier includes a U-shaped bracket and is secured to said Bourdon tube end at a location along a side face of said bracket which is functionally correlated to the extent of said deviate residual tip travel.

3. In a pressure gauge according to claims 1 or 2 in which said amplifier is positioned at a predetermined fixed distance relative to a stationary reference indicia in said gauge when secured to said Bourdon tube.

4. In a pressure gauge according to claim 3 in which said amplifier and said Bourdon tube are secured together by a weld between adjacent surfaces thereof.

* * * * *